UNITED STATES PATENT OFFICE.

GEORGE THOMPSON, OF PHILADELPHIA, PA., ASSIGNOR, BY MESNE ASSIGNMENTS, TO THE PENNSYLVANIA SALT MANUFACTURING COMPANY.

IMPROVEMENT IN THE MANUFACTURE OF CAUSTIC ALKALI.

Specification forming part of Letters Patent No. 15,957, dated October 21, 1856; reissue No. 654, dated February 1, 1859; reissue No. 2,569, dated April 16, 1867; extended seven years; reissue No. 5,886, dated May 26, 1874; application filed May 16, 1874.

*To all whom it may concern:*

Be it known that I, GEORGE THOMPSON, late of East Tarentum, county of Allegheny, now of Philadelphia, State of Pennsylvania, have invented a new and useful Improvement in the Manufacture of Caustic Alkalies; and that the following is a full, clear, and exact description thereof.

Hydrate of soda and potassa, commonly known as caustic soda and potash, would prove very useful for domestic and other purposes; but, owing to the fact that they speedily deliquesce after being exposed, even for a short time, to the action of atmospheric air, and that by their caustic property they attack and destroy almost everything with which they are allowed to come in contact in their deliquescent state, it has been found practically impossible to manufacture these articles in a condition fit for preservation and transportation for family and other uses.

My invention consists in a new article of manufacture, based on the discovery that if caustic alkali, immediately after being melted and molded, be surrounded by a covering of melted resin, or similar material, the coating will not be corroded or saponified, and will protect and preserve the alkali.

If blocks of caustic alkali be inclosed or united with such material, a new and valuable article of manufacture and commerce will be produced.

One mode of applying this discovery to the preservation of caustic alkali adopted by me consisted in first saturating cloth or paper with melted rosin, or rosin mixed with tar, melted bees-wax, or other similar substance, and then wrapping the block of alkali therewith.

To secure a pefrect and entire coating, this wrapped block should be immersed in the same melted material.

The use of these materials for the coating or integuments has this advantage, that, being themselves thoroughly saponifiable, when the prepared blocks are used for making soap, they will not injuriously affect the soap, and, therefore, they need not be removed at the time of using it.

The blocks of caustic soda or potash formed by being melted and molded, as soon as they are sufficiently solid to bear handling, are immediately folded up in wrapping of paper or muslin saturated with melted rosin, or melted tar and rosin mixed, wax, or similar material, as stated above. The blocks thus wrapped are then immersed in the same melted preparation of rosin, wax, or mixed tar and rosin, used for saturating the wrapping fabric, which immersion in the melted material gives it a uniform exterior coating.

Caustic alkali can thus be obtained in packages of a size suitable for family use, and in a shape to be preserved for a long time, and when used for making soap, the rosin and bees-wax, &c., will not injuriously affect the soap, and need not, therefore, be removed.

Having thus described my invention, what I claim as new, and desire to secure by Letters Patent, as a new article of manufacture, is—

A block of molded caustic alkali inclosed in rosin, bees-wax, or other similar saponifiable material, substantially as described.

GEORGE THOMPSON.

Witnesses:

HORACE BINNEY, 3rd,
JAMES QUINN.